United States Patent [19]

Hedrich

[11] 4,194,408
[45] Mar. 25, 1980

[54] GEAR-SHIFT CONTROL FOR BICYCLE TRANSMISSION

[76] Inventor: Eberhard Hedrich, Osdorfer Landstr. 161, 2000 Hamburg 53, Fed. Rep. of Germany

[21] Appl. No.: 847,049

[22] Filed: Oct. 31, 1977

[30] Foreign Application Priority Data

Oct. 30, 1976 [DE] Fed. Rep. of Germany ....... 2650011

[51] Int. Cl.$^2$ .............................................. F16H 9/00
[52] U.S. Cl. ................................................ 74/217 B
[58] Field of Search ...................... 74/217 B, 501, 568

[56] References Cited

U.S. PATENT DOCUMENTS

| 2,966,969 | 1/1961 | Morse | 74/501 |
| 3,808,907 | 5/1974 | Yamaguchi | 74/217 B |
| 4,116,079 | 9/1978 | Pearce et al. | 74/217 B |

FOREIGN PATENT DOCUMENTS 1395224  5/1975  United Kingdom ................... 74/217 B Primary Examiner—Samuel Scott
Assistant Examiner—Wesley S. Ratliff, Jr.

Attorney, Agent, or Firm—Karl F. Ross

[57] ABSTRACT

A bicycle transmission with one or two driving sprockets on a pedal shaft, selectively connectable with any one of several driven sprockets of progressively varying diameters on a rear-wheel axle, is controlled by a gear-shifting lever rigid with one or two cam disks each coacting with a cam follower on an associated rocker arm. Each rocker arm is tied to a flexible link, such as a Bowden cable, serving for the relative axial shifting of the chains and a respective sprocket set to let the chain jump from one driven (or driving) sprocket to an adjoining one. Each cam disk has a plurality of peripheral lands whose distances from the disk axis determine the engagement of the chain with one of the sprockets of the associated group. With two driving sprockets and five driven sprockets, providing ten different speed ratios, each disk has ten lands divided into two groups; on one disk the two groups of lands lie on a low dwell and on a high dwell, respectively, whereas on the other disk the lands are identically stepped in the two groups. At least one land of each pair of lands simultaneously engaged by the two cam followers is formed as a notch yieldably retaining the shift lever in its selected position.

5 Claims, 9 Drawing Figures

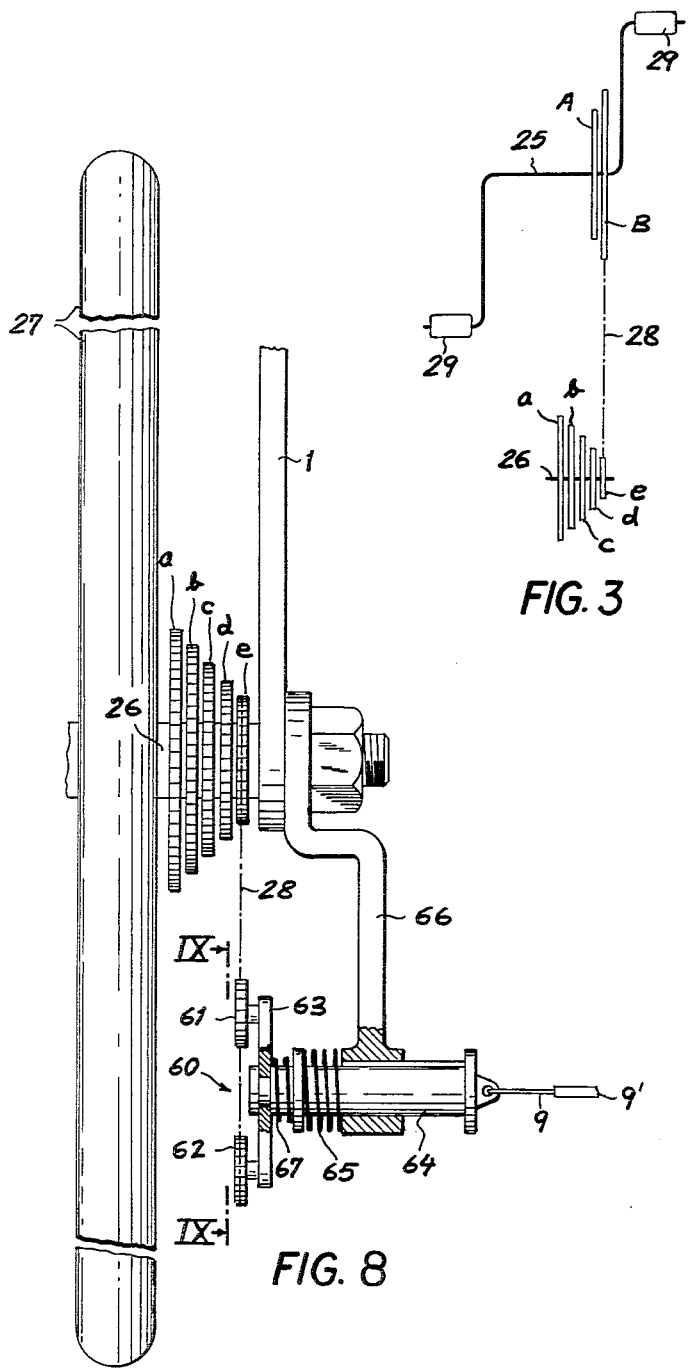
FIG. 3
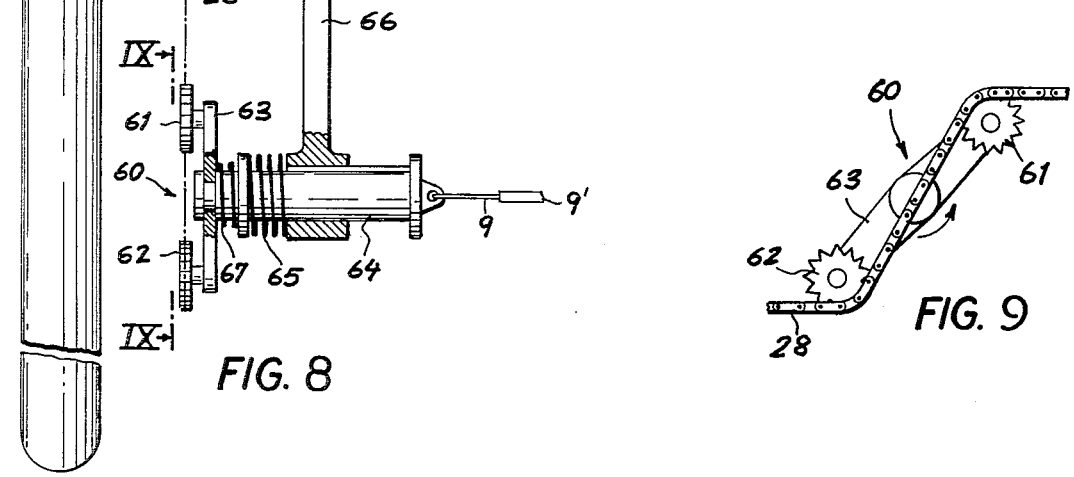
FIG. 8
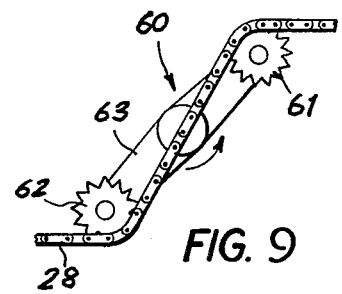
FIG. 9
| GEAR | DRIVING SPROCKET | DRIVEN SPROCKET |
|---|---|---|
| 1 | A | a |
| 2 | A | b |
| 3 | A | c |
| 4 | A | d |
| 5 | A | e |
| 6 | B | a |
| 7 | B | b |
| 8 | B | c |
| 9 | B | d |
| 10 | B | e |
FIG. 4

GEAR-SHIFT CONTROL FOR BICYCLE TRANSMISSION

FIELD OF THE INVENTION

My present invention relates to a transmission for a bicycle of the multispeed type and, more particularly, to a mechanism for controlling the shift of such a transmission from one speed ratio to another.

BACKGROUND OF THE INVENTION

Gear-shifting devices are know, e.g. from U.S. Pat. Nos. 3,362,238 and 3,394,604, wherein a shift lever or a mounting therefor is provided with a ball check enabling the indexing of that lever in its several working positions. It has also been proposed (see, for example, British Pat. No. 661,843) to provide such a mechanism with a cam disk which can be stepped by back-pedaling into successive operating positions for establishing a variety of speed ratios, albeit only in a predetermined sequence.

OBJECTS OF THE INVENTION

The general object of my present invention is to provide a simple gear-shifting mechanism for a multispeed bicycle transmission in which any of the available speed ratios is freely selectable and which reliably maintains its selected position.

A more particular object is to provide a mechanism of this character using a single control member for selective transfer of a driving chain among two sets of sprocket wheels, e.g. two driving sprockets on a pedal shaft and five driven sprockets on a traction-wheel shaft giving a total of ten speed ratios or gears.

SUMMARY OF THE INVENTION

In a simple multispeed transmission in which one of the two shafts carries only a single sprocket wheel, my invention provides for cam means rotatable by a control member about an axis and provided with a plurality of stepped lands which are respectively assigned to a set of sprockets on the other shaft (referred to hereinafter, for convenience, as driven sprockets) among which the chain can be selectively transferred by conventional gear-shifting means. A cam follower engageable with any of these lands, in respective working positions of the control member, is linked with the gear-shifting means for operatively aligning the chain with the driven sprocket to which the engaged land is assigned.

In a more complex transmission having m driving sprockets and n driven sprockets, with first and second gear-shifting means for axially displacing respective chain loops relatively to the driving sprockets and the driven sprockets, I provide the rotatable cam means with m groups of n first lands, engageable by a first cam follower linked with the first gear-shifting means, and with m groups of n second lands, engageable by a second cam follower linked with the second gear-shifting means, one chain loop remaining operatively aligned with a selected driving sprocket upon engagement of the first cam follower with any first land of a group assigned to that driving sprocket, the other chain loop being operatively alignable with all n driven sprockets by engagement of the second cam follower with respective second lands of any group. The role of driving and driven sprockets could, however, be interchanged.

According to a more particular feature of my invention, each cam follower is coupled with the associated gear shifter by a spring-loaded flexible link such as a wire or cable holding it in contact with the engaged land. Thus, no ancillary spring force of a ball check or the like is needed for maintaining the selected position. This retaining force, exerted by the gear shifter itself, is particularly effective if each land, or at least one land of any pair of lands concurrently engaged by the two cam followers of the more complex transmission system referred to, is designed as a peripheral notch of a camming disk.

BRIEF DESCRIPTION OF THE DRAWING

The above and other features of my invention will now be described in detail with reference to the accompanying drawing in which:

FIG. 3 is a diagrammatic view of a chain drive linking a pedal shaft with a rear-wheel shaft of the bicycle;

FIG. 4 is a table giving the relationships between the several speed ratios and the operating positions of the chain drive shown in FIG. 3;

FIG. 8 is a fragmentary end view of the rear part of a bicycle equipped with the chaim drive of FIG. 3; and FIG. 9 is a partial cross-sectional view taken on the line IX—IX of FIG. 8.

SPECIFIC DESCRIPTION

Figure 1:
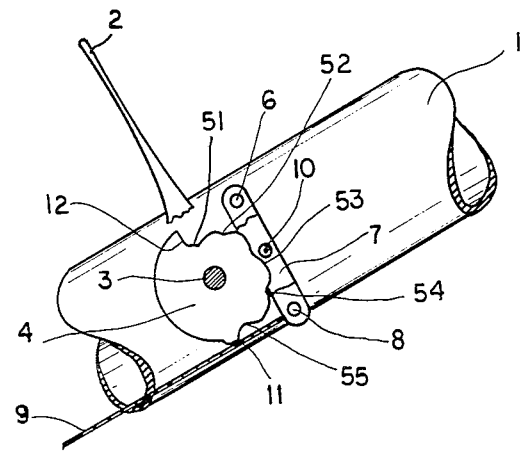
FIG. 1 is a side-elevational view of part of a bicycle frame carrying a portion of a gear-shifting mechanism according to my invention.
Figure 2:
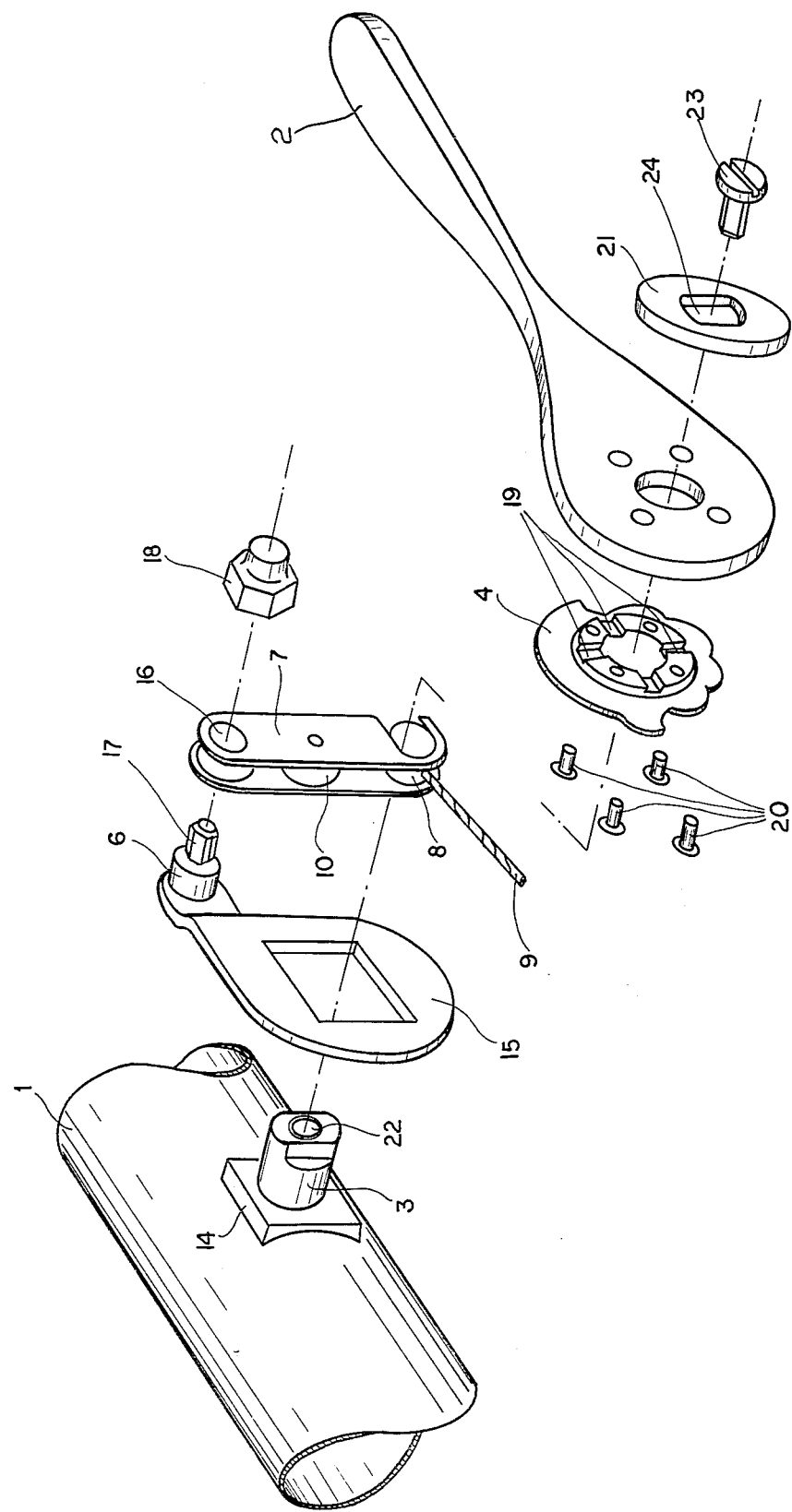
FIG. 2 is an exploded view of the assembly shown in FIG. 1.

In FIGS. 1 and 2 I have shown at 1 a portion of a bicycle frame carrying a pin 3 on which a shift lever 2 is freely rotatable. A cam disk 4 juxtaposed with lever 2 has angularly spaced recesses 19 receiving mating projections (not shown) of lever 2 so as to be rotatively entrainable thereby; lever 2 and disk 4 are held together by rivets 20 passing through aligned apertures thereof. Pin 3, rising from a square base 14 on frame 1, has a flattened end received in a complementary cutout 24 of a washer 21 which holds the lever 2 and the cam disk 4 against base 14 under pressure of a screw 23 engaging threads 22 in a bore of pin 3. Base 14 is received in a square opening of a stationary mounting plate 15 which is held in position by the rotatable assembly 2,4 and carries a pivot stud 6 with a threaded extremity 17. A rocker arm 7 has at one end a bore 16 traversed by the stud 6 onto which a cap nut 18 is threaded; the opposite, free end of arm 7 forms a cradle for a terminal 8 of a flexible link, such as the core of a Bowden cable, extending under a tension to a gear shifter illustrated in FIGS. 8 and 9. A cam rider 10 (which may be a roller or a fixed stud) mounted midway on arm 7 serves as a cam follower coacting with disk 4.

Disk 4 is provided, over an angular range of somewhat more than 180° bounded by two end stops 11, 12, with lands 51–55 lying at progressively increasing distances from the disk axis, these lands being in the form of notches bounded by peripheral portions of larger radii. Cam rider 10 comes to rest in any of these notches, under a spring tension acting via link 9 upon the free end of rocker arm 7, so as yieldably to retain the disk 4 and with it the lever 2 in a selected working position. Upon successive coaction of roller 10 with notches 51-55, the virtually nonextendible link 9 is progressively pulled up to shift a pedal-operated endless chain 28, FIGS. 8 and 9, relatively to a set of driven sprockets a, b, c, d, e mounted on a shaft 26 of a rear bicycle wheel 27. Engagement of notch 51 establishes a low-speed position in which chain 28 is operatively aligned with, and looped about, the largest sprocket wheel a; engagement of notches 52, 53, 54, 55 operatively aligns the chain with the sprocket wheels b, c, d and e of successively smaller diameters with progressive increase in the ratio of wheel speed to pedal speed.

The transfer of chain 28 from any driven sprocket to an adjoining one could be carried out, with maintenance of a given chain position, by axially shifting a spring-loaded hub carrying the sprockets a-e on shaft 26. As illustrated in FIGS. 8 and 9, however, the sprockets are axially fixed and the chain loop embracing these sprockets is axially displaceable by a gear shifter generally designated 60. This gear shifter, which is similar to one disclosed in my copending application Ser. No. 789,227 filed 20 Apr. 1977, comprises two rollers 61 and 62 on a chain guide 63 which has a stem 64 sliding in a support 66 fixed to frame 1 on being laterally displaced to the left (as viewed in FIG. 8) by the pull of wire link 9 against the restoring force of a compression spring 65. The Bowden cable comprising the wire 9 has a sheath 9' secured to the frame 1.

Chain guide 63 is swingable about stem 64 and is biased by a coil spring 67 in a counterclockwise sense (as viewed in FIG. 9) to hold the chain 28 under tension as its effective length changes upon transfer from one sprocket wheel to another. Obviously, these sprocket wheels must be close enough to one another to prevent the chain from falling into the intervening spaces.

With the arrangement so far described, five different speed ratios are selectable by rotation of lever 2 (FIG. 1) into any of its several working positions in the range defined by stops 11 and 12. The other loop of chain 28, remote from shaft 26, may be permanently wound around a single driving sprocket.

As diagrammatically illustrated in FIG. 3, however, I may provide a plurality of such driving sprockets (here two) to multiply the number of available speed ratios. Thus, FIG. 3 shows a pair of pedals 29 on a shaft 25 carrying two sprockets A and B of smaller and larger diameter, respectively. FIG. 4 gives the ten speed ratios or gears establishable by selection of different combinations of driving sprockets A, B and driven sprockets a-e. Obviously, the same number of gears would be available with five driving sprockets and two driven sprockets.

Figure 6:
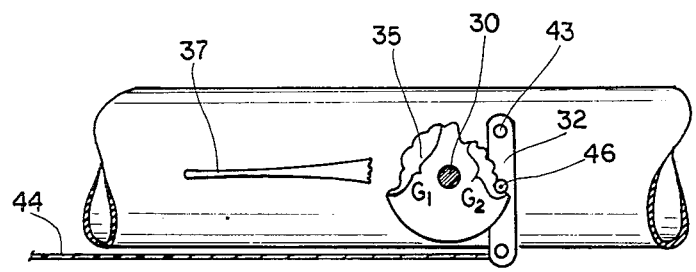
FIG. 6 is a side-elevational view similar to FIG. 1, showing the profile of a cam disk forming part of the mechanism of FIG. 5.
Figure 7:
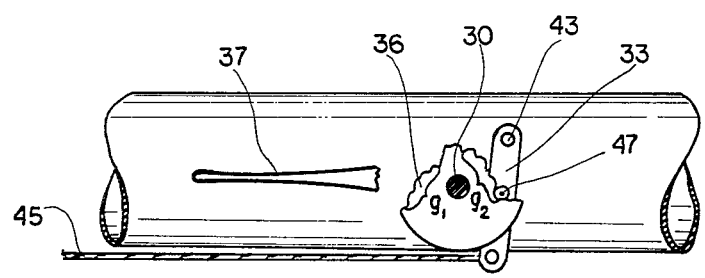
FIG. 7 is a view like FIG. 6 but showing the profile of another cam disk of that mechanism.
Figure 5:
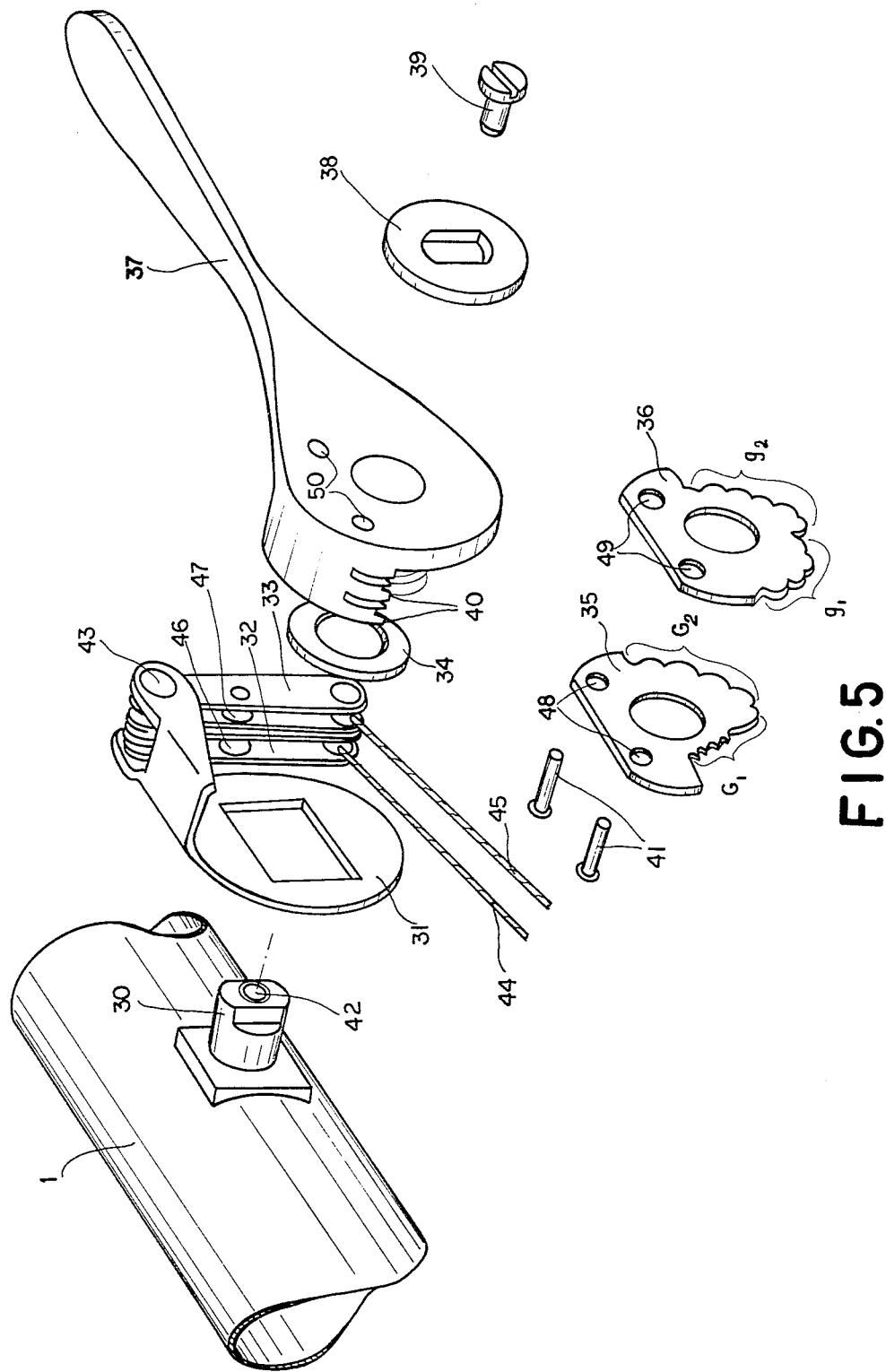
FIG. 5 is a view similar to FIG. 2, illustrating another embodiment.

In FIGS. 5-7 I have shown a control mechanism according to my invention for the transmission illustrated in FIG. 3. A pin 30 on frame 1, having a threaded bore 42, successively traverses a fixed mounting plate 31 with a square opening penetrated by the pin base, a spacing ring 34, a shift lever 37 and a washer 38 held against rotation by a flattened end of pin 30, the assembly of these elements being maintained by a screw 39 threaded into bore 42. Lever 37 has a boss with two transverse slits 40 forming seats for a pair of cam disks 35, 36 held in position by rivets 41 which pass through aligned apertures 48, 49 in these cam disks and 50 in the lever.

Each cam disk has ten peripheral notches divided into two groups of five notches each, designated $G_1$, $G_2$ in the case of disk 35 and $g_1$, $g_2$ in the case of disk 36. The notches of group $G_1$ all lie on the same relatively small radius and thus collectively define a low dwell; the notches of group $G_2$ all lie on a common relatively large radius and thus collectively define a high dwell. The notches of each group $g_1$ and $g_2$ have a profile which is the reverse of that of notches 51-55 in FIG. 1, varying from a large radius for the first notch of the group to a small radius for the last notch thereof. Each notch of disk 35 is paired with a respective notch of disk 36 aligned therewith.

Two rocker arms 32, 33 are fulcrumed on a pin 43, spanning a bifurcate extension of mounting plate 31, and carry cam riders 46 and 47 in the form of rollers or studs engageable with the notches of disks 35 and 36, respectively. The free ends of arms 32 and 33 are anchored to spring-loaded wire links 44, 45, again preferably constituted by cores of Bowden cables, leading to respective gear shifters respectively engaging the lower run of the chain 28 in the vicinity of wheel shaft 26 and its upper run in the vicinity of pedal shaft 25. Each of these gear shifters may be similar to the assembly 60 shown in FIGS. 8 and 9; however, sprockets A, B and a-e could be mounted on a pair of hubs axially slidable on their shafts, against the force of associated restoring springs, under tension of wires 44 and 45 while the chain is retained in a fixed vertical plane by suitable guide brackets.

In the first five of the ten working positions, in which the cam riders 46 and 47 confront the notches of groups $G_1$ and $g_1$, respectively, chain 28 engages the driving sprocket A (cf. FIG. 4) and any one of the five driven sprockets a-e to establish the five lower speed ratios. In the remaining working positions, the notches of groups $G_2$ and $g_2$ are engaged so that sprocket B is driving and one of the five higher speed ratios is established according to which one of the sprockets a-e is driven.

For the indexing of lever 37 in any working position it suffices if only one of the two simultaneously engaged lands is a notch. Thus, for example, the periphery of disk 35 need not be serrated in its operative range, as shown, but may be divided into two smooth arc segments of smaller and larger radius, with no physical separation of the lands of either group $G_1$, $G_2$. The several notches or lands need not be angularly equispaced as long as they are properly aligned on disks 35 and 36; such alignment, of course, applies only to the case where—as shown in FIG. 5—the two cam followers 32, 46 and 33, 47 are substantially identical and swingable about a common pivotal axis.

Some of the advantages of my invention could also be realized, in a transmission with m·n speed ratios having m driving sprockets and n driven sprockets, by the use of separate shift levers as shown in FIGS. 1 and 2 for the two sets of sprockets. In that instance, however, the changeover from fifth to sixth gear would require a simultaneous operation of both levers, which would be inconvenient and could distract the attention of the rider especially in a bicycle race. This problem is eliminated by the use of a single lever 37 as shown in FIGS. 5-7.

Lever 2 or 37 can be mounted on any part of frame 1 within reach of the bicycle rider.

I claim:

1. A bicycle transmission adapted to establish a plurality of speed ratios between a pedal shaft and a traction-wheel shaft journaled in a frame, comprising:
   at least one first sprocket on one of said shafts;
   a plurality of second sprockets of progressively varying diameters on the other of said shafts;
   an endless chain capable of connecting said first sprocket with any of said second sprockets;
   gear-shifting means for relatively axially displacing said chain and said second sprockets to transfer the chain from one second sprocket to an adjoining one;
   a control member on said frame within reach of a user;
   a cam disk rotatable by said control member about an axis and provided with a plurality of substantially equispaced peripheral notches respectively assigned to said second sprockets and disposed at progressively varying distances from said axis; and
   a rocker arm pivoted to said frame at one end and having another end linked with said gear-shifting means by a spring-loaded cable, said arm carrying between said ends a cam-follower element juxtaposed with said disk for entering any confronting notch thereof under stress from said cable, thereby indexing said control member in any selected working position while acting through said cable upon said gear-shifting means to maintain said chain in operative alignment with the corresponding second sprocket.

2. A bicycle transmission as defined in claim 1 wherein said second sprockets are mounted on said traction-wheel shaft.

3. A bicycle transmission adapted to establish a plurality of speed ratios between a pedal shaft and a traction-wheel shaft journaled in a frame, comprising:
   a set of m first sprockets on one of said shafts;
   a set of n second sprockets on the other of said shafts;
   an endless chain capable of connecting ony one of said first sprockets with any one of said second sprockets to establish m·n different speed ratios;
   first gear-shifting means for relatively axially displacing a first loop of said chain and said first sprockets into any one of m positions of operative alignment of said chain with a respective first sprocket;
   second gear-shifting means for relatively axially displacing a second loop of said chain and said second sprockets into any one of n positions of operative alignment of said chain with a respective second sprocket;
   a control member on said frame within reach of a user, said control member having m·n working positions;
   cam means rotatable by said control member about an axis and including a pair of juxtaposed disks respectively provided with m groups of n first lands and with m groups of n second lands substantially equispaced along the peripheries of said disks;
   first cam-follower means engaging said first lands in respective working positions of said control member and coupled by a first spring-loaded flexible link with said second gear-shifting means;
   said first loop remaining operatively aligned with any one of said first sprockets upon engagement of said first cam-follower means with any first land of a corresponding group;
   said second loop being operatively alignable with all n second sprockets by engagement of said second cam-follower means with respective second lands of any group.

4. A bicycle transmission as defined in claim 3 wherein at least one land of each pair of lands simultaneously engaged by said first and second cam-follower means in any working position of said control member is a notch yieldably retaining the associated cam-follower means, thereby indexing said control member in any selected working position.

5. A bicycle transmission as defined in claim 3 wherein said m first sprockets are two driving sprockets on said pedal shaft, said n second sprockets being five driven sprockets on said traction-wheel shaft.

* * * * *